(12) United States Patent
van der Heide

(10) Patent No.: US 6,349,784 B1
(45) Date of Patent: Feb. 26, 2002

(54) MOTORCYCLE PROVIDED WITH A STEERING HUB

(75) Inventor: Hendrik Roelof van der Heide, Ijmuiden (NL)

(73) Assignee: Chiqane B.V., Ijmuiden (NL)

( * ) Notice: Subject to any disclaimer, the term of this patent is extended or adjusted under 35 U.S.C. 154(b) by 0 days.

(21) Appl. No.: 09/609,850

(22) Filed: Jul. 5, 2000

Related U.S. Application Data

(63) Continuation of application No. PCT/NL99/00002, filed on Jan. 4, 1999.

(30) Foreign Application Priority Data

Jan. 5, 1998 (NL) .............................................. 1007955

(51) Int. Cl.[7] .............................................. B62D 61/02
(52) U.S. Cl. ...................... 180/219; 280/277; 280/279; 280/286
(58) Field of Search ........................... 180/219; 280/269, 280/276, 277, 270, 279, 274, 281.1, 286; 301/1, 110.5, 111

(56) References Cited

U.S. PATENT DOCUMENTS

| | | | | |
|---|---|---|---|---|
| 1,266,611 A | * | 5/1918 | Moore ........................ | 280/270 |
| 4,265,329 A | * | 5/1981 | De Cortanze ............... | 180/219 |
| 4,702,338 A | * | 10/1987 | Trema ........................ | 180/219 |
| 4,721,179 A | | 1/1988 | Yamaguchi et al. | |
| 4,741,545 A | * | 5/1988 | Honma et al. .............. | 280/276 |
| 4,756,547 A | * | 7/1988 | Trema ........................ | 280/276 |
| 4,807,898 A | * | 2/1989 | Huntly ....................... | 280/276 |
| 4,828,069 A | * | 5/1989 | Hatsuyama ................. | 280/277 |
| 5,014,808 A | | 5/1991 | Savard et al. | |
| 5,042,609 A | | 8/1991 | Krispler et al. | |
| 5,069,467 A | * | 12/1991 | Claudio ...................... | 280/276 |
| 5,156,231 A | * | 10/1992 | Trema ........................ | 180/219 |
| 5,361,864 A | * | 11/1994 | Tanaka ....................... | 180/219 |
| 5,417,305 A | * | 5/1995 | Parker ........................ | 180/219 |

FOREIGN PATENT DOCUMENTS

| | | | | |
|---|---|---|---|---|
| EP | 0 432 107 | | 6/1991 | |
| FR | 1 000 493 | | 2/1952 | |
| FR | 2589421 | * | 5/1987 | ................. 280/270 |
| FR | 2 591 554 | | 6/1987 | |
| GB | 833 741 | | 4/1960 | |
| GB | 1274441 | * | 5/1972 | ................. 280/277 |
| JP | 136995 | * | 5/1972 | ................. 280/277 |
| JP | 204884 | * | 5/1972 | ................. 180/219 |
| JP | 204887 | * | 8/1989 | ................. 180/219 |
| WO | WO 88/05743 | | 8/1988 | |

OTHER PUBLICATIONS

Stevenson: "Hubble, bubble, toil and trouble" Bike 228, Apr. 1992, pp. 56–58, p. 57, col. 3, paragraphs 2 and 3.

* cited by examiner

Primary Examiner—Daniel G. DePumpo
(74) Attorney, Agent, or Firm—Davis Wright Tremaine LLP

(57) ABSTRACT

The invention provides a motorcycle with hub steering, the axle of the hub being fixedly connected to first support arms and being disposed in such a manner that it can turn with respect to the hub body. Second support arms are arranged in such a manner that the front pivot points and rear pivot points lie on non-parallel lines. Attaching the front wheel in this way results in an improved suspension and increased stability of a motorcycle with hub steering.

11 Claims, 4 Drawing Sheets

MOTORCYCLE PROVIDED WITH A STEERING HUB

CROSS-REFERENCE TO RELATED APPLICATIONS

This is a continuation application of PCT/NL99/00002 filed Jan. 4, 1999.

FIELD OF THE INVENTION

The invention relates to a motorcycle with what is known as hub steering, and in particular to a front wheel suspension for a motorcycle of this nature.

BACKGROUND OF THE INVENTION

In standard motorcycles, the steering wheel, which is generally the front wheel, is held in a front fork with the aid of its hub and axle. The wheel can turn due to the fact that the front fork as a whole is arranged so that it can turn with respect to the frame of the motorcycle. The hub merely allows the wheel to rotate about its axle.

Designs are also known in which the wheel can turn with respect to its axle. An example of such designs is shown in French patent 1,000,493. In this known design, the (driven) axle is accommodated in the hub by means of a cardan structure. The wheel, which obviously moves together with the hub, is able to turn freely with respect to the axle. The wheel is steered by means of a steering arm, which is preferably arranged resiliently.

This known design has various drawbacks. Firstly, the cardan suspension is not free from vibration. Secondly, the imaginary line about which the wheel is turned during steering passes straight through the axle, resulting in unsatisfactory motorcycle driving characteristics. In particular, the stability will be inadequate.

American patent U.S. Pat. No. 5,042,609 describes a motorcycle with a turnable hub, the turning axis of the handlebars intersecting the wheel axle. The hub is connected to the frame of the motorcycle by means of a single support arm.

European patent EP 0,432,107 likewise describes a motorcycle with a pivotable hub. This hub, the axle of which is fixedly connected to the frame of the motorcycle, allows the wheel, which is arranged so that it can rotate about the hub, to turn. In connection with this hub, the said patent notes that the axle may be arranged in front of the turning axis of the handlebars, in such a manner that the axis of rotation of the wheel and the turning axis of the handlebars do not intersect one another. This known hub is connected to the frame of the motorcycle by means of a single pair of support arms. A steering rod connects the turnable part of the hub to the handlebars.

A structure of this nature, with a single pair of support arms, has the drawback of being relatively unstable. The support arms can become twisted relatively easily under the influence of transverse forces, and this affects the position of the front wheel and therefore the stability of the motorcycle.

It is noted that U.S. Pat. No. 4,721,179 discloses a motorcycle in which the front wheel is supported by an upper and lower swing arm, in which lines connecting the front and rear upper and lower pivot point intersect one another at a point which lies above the swing arms. However, U.S. Pat. No. 4,721,179 does not relate to a motorcycle having hub steering but to a motorcycle having axial pivot steering. During steering the axle, the hub and the front wheel are turned around ball joints as one unit with respect to the swing arms. With this type of steering it is not possible to achieve the same advantageous change in steering sensitivity during inward or outward springing like with the present invention described below. Furthermore the motorcycle according to U.S. Pat. No. 4,721,179 also does have the disadvantageous bump steering effect.

GB-A-833 741 discloses a motorcycle having hub steering. The hub steering comprises a front wheel axle fixedly held between brackets, the axle holding a king pin onto which a hub body is pivoted. The hub body supports roller bearings on which the front wheel can rotate. The brackets are pivotably connected to two pairs of upper and lower links, one of which is connected to a shock absorber, thus providing a parallelogram type suspension for the front wheel. All of the links are of equal length, and the front lower and upper pivot points lie in a straight vertical line above one another. The rear lower and upper pivot points also lie in a straight vertical line above one another. Furthermore the king pin around which the hub body can turn intersects the centre axis of the axle.

A drawback of the hub steering according to GB-A-833 741 is that its steering sensitivity is poor and unfavourable. The feeling of control over the steering is bad. There is a very disadvantageous bump steering effect. The distance between the turning axis of the hub body and the centre axis of the axle is zero, resulting in the front wheel having no castor. This also makes the motorcycle unstable.

SUMMARY OF THE INVENTION

The object of the invention is to eliminate the above and other drawbacks of the prior art and to provide a motorcycle which allows what is known as hub steering with considerably improved driving characteristics. Furthermore, the invention aims to provide a motorcycle with improved stability.

According to the invention this object is achieved by a motorcycle having hub steering, comprising a frame, a front wheel, a rear wheel and an engine, in which a front line which joins the lower and upper front pivot points, and a rear line which joins the lower and upper rear pivot points, intersect one another at a point which lies above the support arms, in which the turning axis and the centre axis of the axle are situated at a distance from one another, and in which there is a resilient steering connection between handle bars and the front wheel. By providing two sets of upper and lower support arms, preferably above and approximately parallel to the first support arms, it is possible to achieve greater stability of the motorcycle. Designing the support arms in such a manner that the pivot points do not lie on parallel lines, but rather on intersecting lines, results in a highly advantageous steering sensitivity during compression. The distance between the turning axis of the hub body and the centre axis of the axle provides for an advantageous castor. During inward springing with which the front wheel moves upwardly with respect to the motor frame, the specific positions of the pivot points with respect to each other, in combination with the distance between the turning axis of the hub body and the centre axis of the axle, results in a specific path of change of the angle of the turning axis in combination with the amount of castor. That is to say the steering sensitivity changes during inward springing such, that it will be more easy to steer the motorcycle.

BRIEF DESCRIPTION OF THE DRAWINGS

The invention will be explained in more detail below with reference to the drawing, in which.

DESCRIPTION OF THE PREFERRED EMBODIMENT

Figure 1:
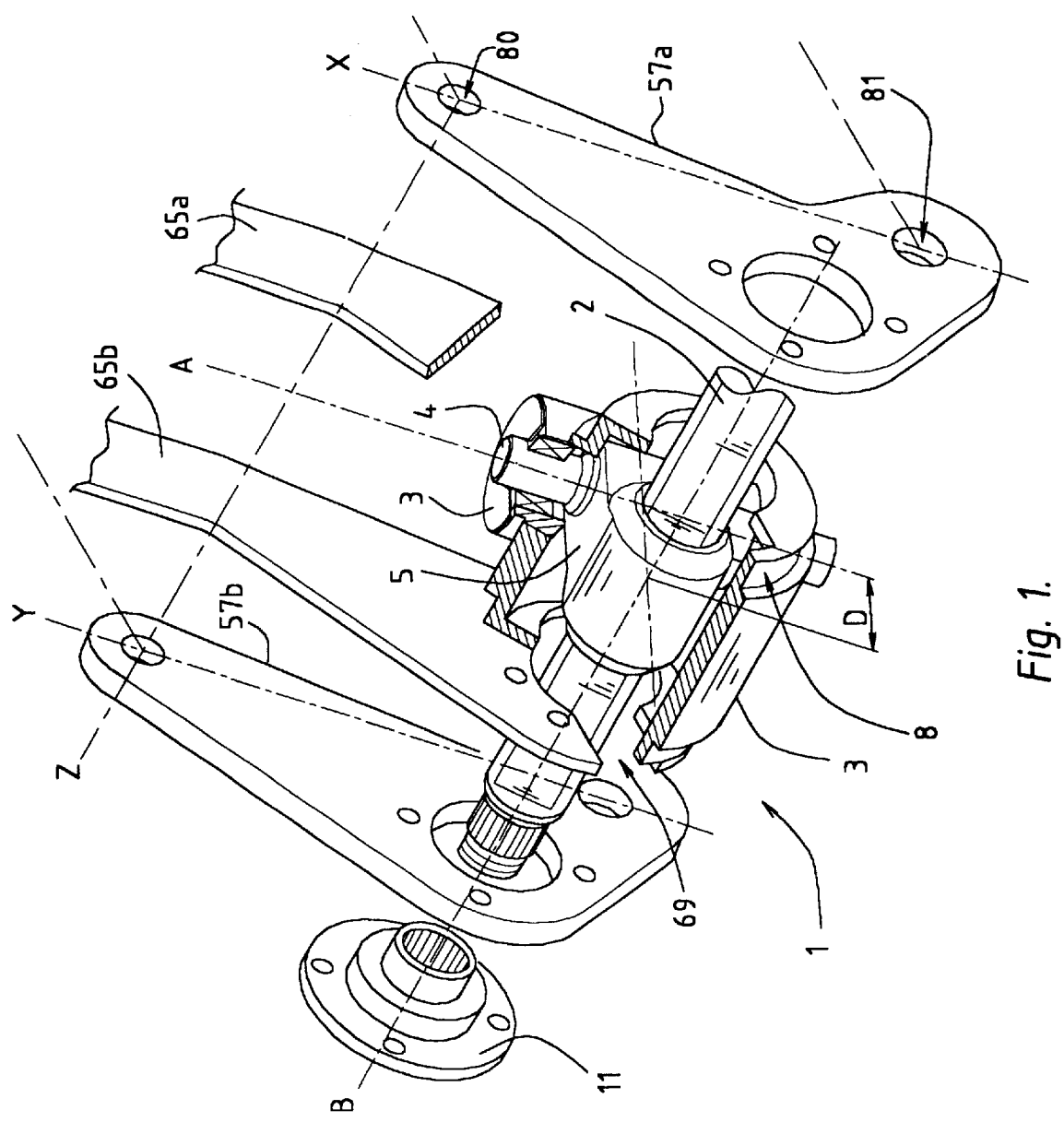
FIG. 1 shows a perspective view of a hub with part of the front suspension according to the invention.

The embodiment of a hub 1 according to the invention which is shown in a perspective, partially cut-away view in FIG. 1 comprises an axle 2, a hub body 3 and a pivot pin 4.

The axle 2 is arranged fixedly, for example by means of a "shrink fit", in a block 5, in which the pivot pin 4 is also held fixedly. The centre axis of the pivot pin (or turning axle) 4 forms the turning axis A of the hub. For this purpose, the pivot pin 4 is connected to the hub body 3 in such a manner that the hub body 3 can turn about the turning axis A. Recesses 8 which serve to accommodate wheel bearings are arranged on the outside of the hub body 3.

With the aid of flanges 11, the axle 2 is arranged fixedly in the connecting pieces 57, which are used to connect the hub to the frame (not shown) of the motorcycle. For the sake of clarity of the figure, only one flange 11 is shown. The ends of the axle 2 are preferably each provided with toothing which engages with the (internal) toothing of the corresponding flange 11, thus preventing unintentional rotation.

Openings 80 and 81 for holding pivot points (60 and 61 in FIG. 4) are arranged in each of the connecting pieces 57a and 57b. As will be explained in more detail below with reference to FIG. 4, the pivot points 60 and 61 serve to attach the connecting pieces 57 in such a manner that they can pivot with respect to the frame of the motorcycle. The lines which join the centre points of the openings 80 and 81, and therefore of the pivot points 60 and 61, in each of the connecting pieces 57a and 57b are respectively denoted by X and Y in FIGS. 1 and 2. The lines X and Y lie (in the load-free state of the motorcycle) in a single plane, together with the line Z which joins the openings 80 in the connecting pieces 57a and 57b. Preferably, the distance D between the turning axis A and the centre axis B of the axle 2 is selected to be such that the turning axis A and the lines X and Y can lie in a single plane. In other words, the lines X, Y and A preferably lie at equal distances from the line B. This results in optimum driving characteristics for the motorcycle equipped with a hub of this nature.

Steering brackets 65a and 65b (of which 65b is shown only in part) are arranged on either side of the hub body 3. An opening 69 which is arranged in the steering brackets 65 simplifies assembly of the axle 2 and the hub 1.

Figure 2:
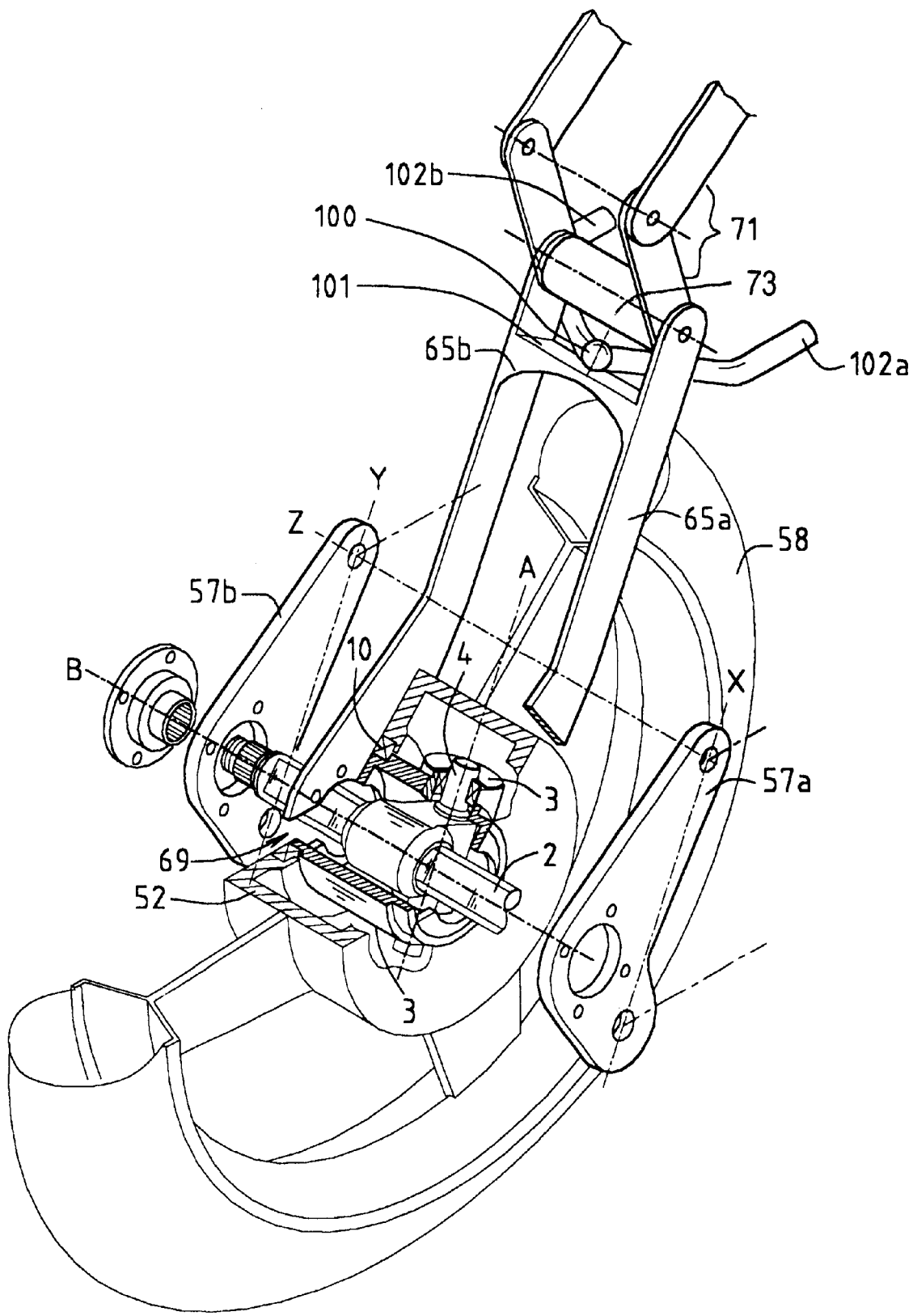
FIG. 2 shows a view, likewise in perspective, of the hub of FIG. 1 in a wheel of a motorcycle.

FIG. 2 shows how the hub 1 of FIG. 1 can be held in a wheel 52 of a motorcycle. Wheel bearings 10, around which the wheel 52 is arranged so that it can rotate, are accommodated in the recesses 8 (cf. FIG. 1) in the hub body 3. Steering brackets 65a and 65b (of which the bracket 65a is shown only in part for the sake of clarity of the drawing) are fixedly connected to the hub body 3, for example by means of screws (not shown). The steering brackets 65a and 65b are rigidly connected to one another by means of an intermediate piece 101, with the result that the separate steering brackets 65a and 65b cannot move or turn with respect to one another. This intermediate piece 101 is pivotably connected, by means of, for example, a ball-and-socket joint 100, to a centering bracket 102 is attached pivotably (cf. Also FIG. 4), by means of the two bracket legs 102a, 102b, to the frame 51 of the motorcycle, as will be explained in more detail below with reference to FIG. 4. This centering bracket 102 prevents any displacement of the steering brackets 65a and 65b, at the location of the intermediate piece 101, parallel to the axle 2. This results in improved steering characteristics for the motorcycle 50.

Figure 4:
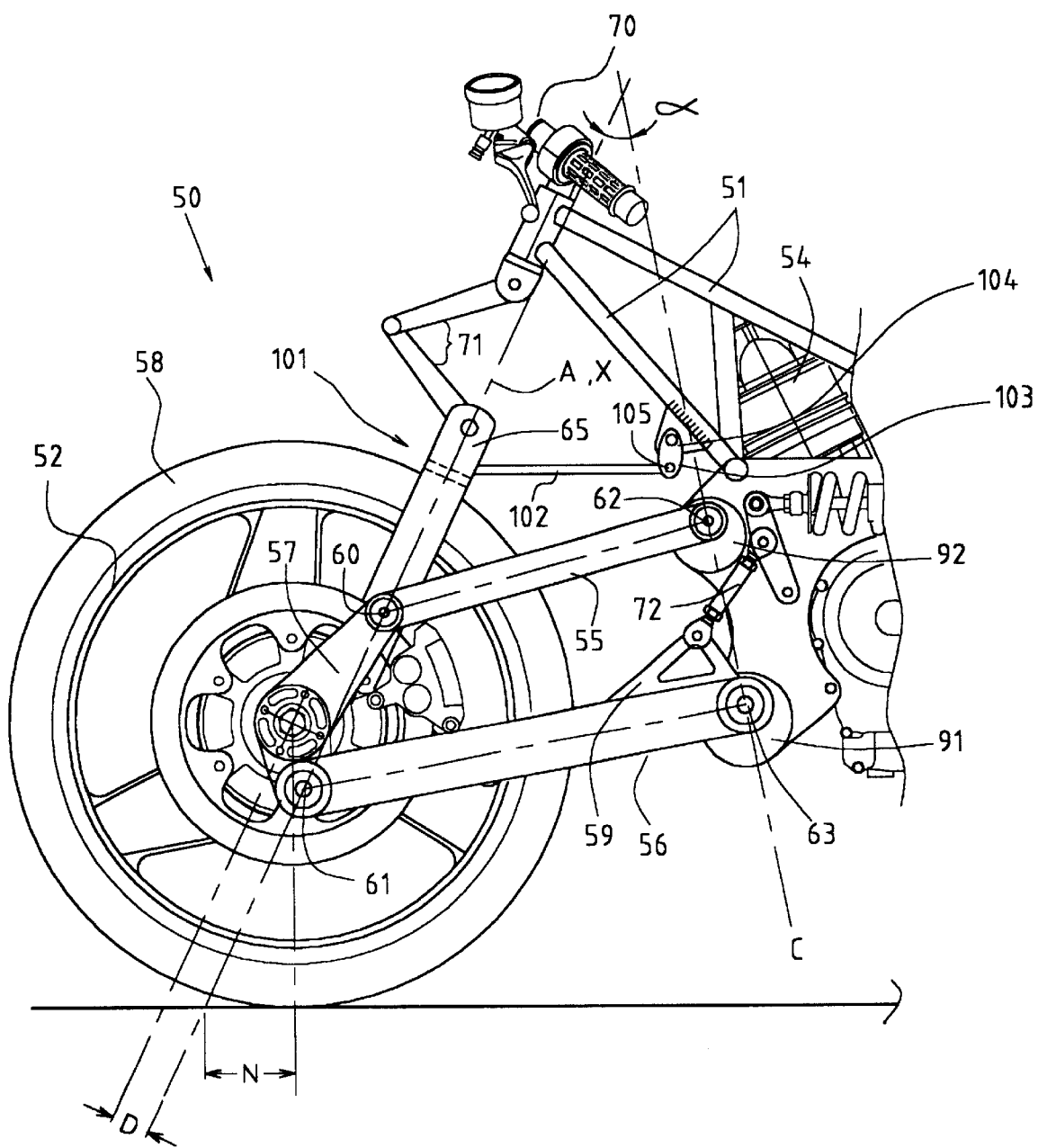
FIG. 4 shows a side view of a motorcycle provided with hub steering according to the invention.

Connecting pieces 71 connect the steering brackets 65 to handlebars (cf. FIG. 4). These connecting pieces are attached in such a manner that they can pivot both with respect to one another and with respect to the steering brackets 65, in order to allow a resilient movement of the wheel 52 with respect to the frame 51.

Furthermore, the steering brackets 65a and 65b, at the location of the pivoting attachment to the bottom connecting pieces 71, are connected to one another by a sleeve 73, in order to be able to transmit the steering movement of handlebars 70 (cf. FIG. 4) to the steering brackets 65a, 65b and the hub body 3 which is attached thereto.

As can be seen from FIG. 2, the wheel 52, around which a tire 58 is arranged, can turn about the turning axis A of the hub 1.

Figure 3:
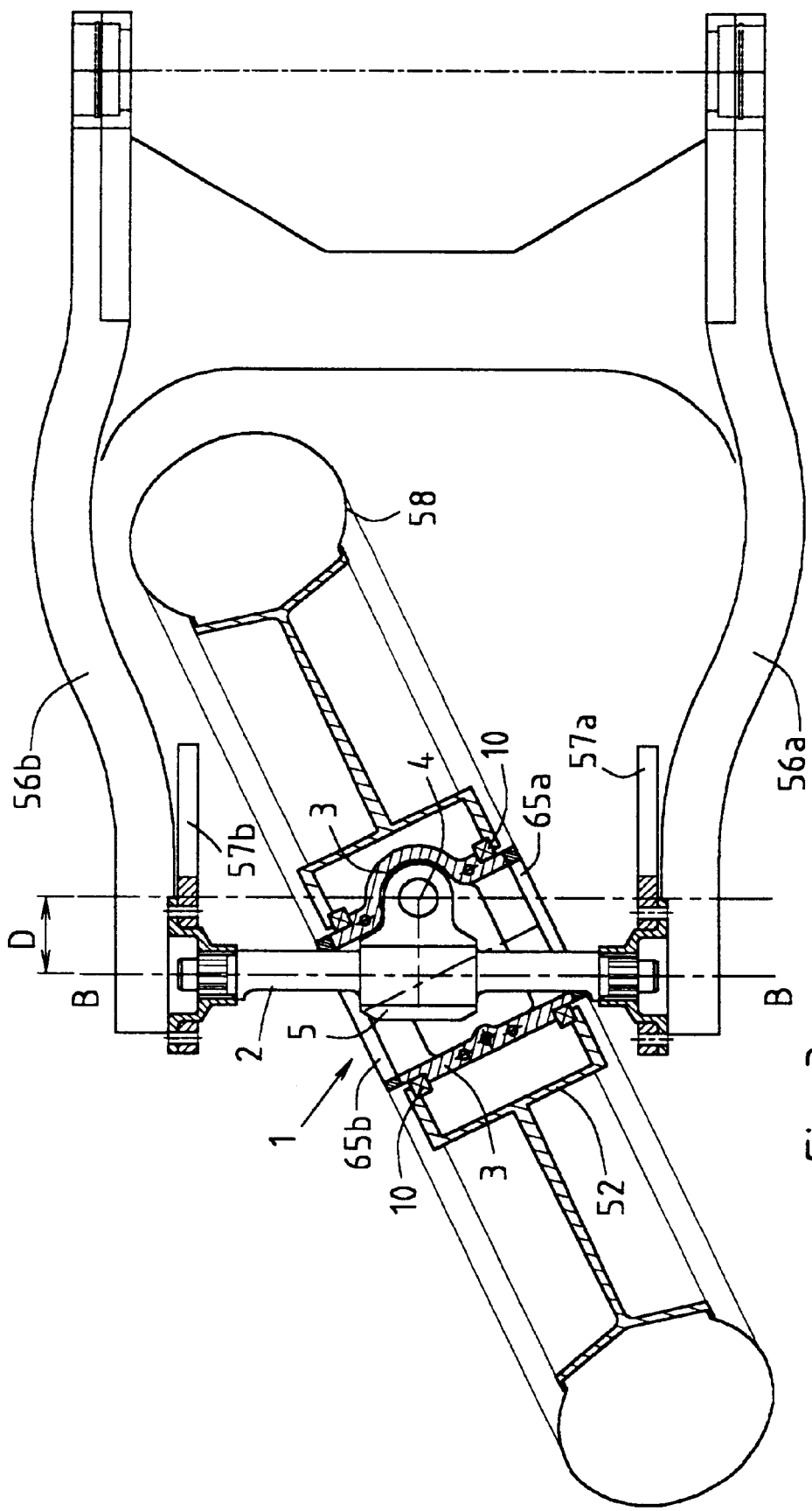
FIG. 3 shows a cross section in a horizontal plane on line B of FIG. 2 with the wheel turned to the left.

FIG. 3 shows a steering hub in its position in which it is installed in the front suspension of a motorcycle according to the invention, the figure showing a cross section in a horizontal plane on line B of FIG. 1, i.e. the center axis of the axle 2. Like FIG. 1, FIG. 3 shows the hub 1, the axle 2 of which is held fixedly, i.e. non-rotatably, in the block 5. The block 5 is arranged fixedly around the pivot pin 4, which for its part is arranged so that it can turn in the hub body 3. It should be noted that the center axis A of the pivot pin 4 (cf. FIG. 1) is preferably not perpendicular to the plane of the drawing of FIG. 3, but rather forms an angle of, for example, 65° with this plane.

Wheel bearings 10 are arranged on the hub body 3 in such a manner that the wheel 52 can rotate about the hub body 3 (cf. FIG. 2). A tire 58 is arranged on the wheel 52.

The axle 2 of the hub 1 is fixedly connected to the connecting pieces 57a and 57b, which for their part are pivotably connected to the (first) support arms 56a and 56b. As can be seen from FIG. 3, the arms 56a and 56b form a single unit in the embodiment illustrated. The assembly comprising the arms 56a and 56b is pivotably connected to the frame of the motorcycle, as will be explained in more detail below with reference to FIG. 4.

In order to be able to steer the hub 1, and therefore the heel 52, the steering brackets 65a and 65b are provided, which are fixedly connected to the hub body 3 on either side of the latter (cf. FIGS. 1 and 2), either directly or indirectly via one or more brake calliper attachment(s) (not shown). In order to be able to attach and remove the wheel 52 easily, the brake calliper attachment is preferably attached firstly to the hub body 3 before the steering bracket is attached thereto. The steering brackets 65a and 65b are preferably resiliently connected to the handlebars of the motorcycle, as will be explained in more detail below with reference to FIG. 4.

As can be seen from FIG. 3, the centre axis A of the pivot pin 4 is situated at a certain distance (denoted in FIG. 3 by D) from the centre axis B of the axle 2. The fact that the turning axis A of the wheel 52 therefore does not intersect the centre axis B of the axle results in improved stability of the motorcycle.

FIG. 4 shows a side view, by way of example, of a part of a motorcycle 50 according to the invention. The rear part of the motorcycle 50 may be constructed in a customary manner, for example in accordance with European patent EP 0,432,107. The motorcycle 50 illustrated comprises a frame 51 and an engine 54 which is accommodated therein. A hub according to the invention, which is fixedly connected to the connecting piece 57 by means of a bolt, for example, is accommodated in the wheel 52. The connecting pieces 57 are connected to the frame 51 by means of first lower arms 56 and second upper arms 55 (only the left-hand arms being shown in FIG. 4; cf. also FIG. 3). The first arms 56 are connected by means of the pivot points 61 and 63, respectively, to the connecting pieces 57 and frame 51, while the second arms 55 are connected by means of the pivot points 60 and 62, respectively, to the connecting pieces 57 and the frame 51. A support 59 and a rod 72, which is pivotably connected thereto, provide the coupling between the first support arm 56 and a suspension mechanism. The pivot points 62 and 63 are connected to the frame by means of adjustable eccentrics 91 and 92.

The steering bracket 65 is connected to the hub, as illustrated in more detail in FIGS. 2 and 3. In this embodiment, pivotably arranged connecting pieces 71 connect the steering brackets 65 to the handlebars 70, resulting in a resilient steering connection between the handlebars 70 and the wheel 52. In FIG. 4, the connecting pieces 71 are illustrated to the left of the central pivot in the plane of the drawing, but may also be arranged on the right. The latter embodiment is preferred, in order to achieve improved steering characteristics. Other forms of coupling between the steering brackets 65 and the handlebars 70 are also possible.

The intermediate piece 101, which is pivotably connected to the centering bracket 102 (cf. Also FIG. 2) is also positioned on the steering brackets 65a and 65b. By means of pivots 105 (on both sides of the frame 51), the legs 102a and 102b of the centering bracket 102 are pivotably connected to auxiliary rods 103, which are also pivotably attached to the frame 51 with the aid of pivots 104. The fork-like shape of the centering bracket 102 (cf. FIG. 2) prevents displacement of the steering brackets 65a and 65b parallel to the axle 2, and does not limit the resilient movement of the wheel 52 and the steering brackets 65a, 65b attached thereto.

As can be seen from FIG. 4, the line X which joins the pivot points 60 and 61 is situated at a distance D' from the centre axis (B in FIGS. 1, 2 and 3) in the embodiment illustrated. As can be seen from FIG. 2, this distance D' corresponds to the distance D between the turning axis (centre axis of the pivot pin 4) A and the centre axis B of the axle 2. Moreover, in the embodiment illustrated, the orientation of the lines A and X is identical. As a result, the turning axis (A in FIG. 1) will lie in the same plane as the line X which joins the front pivot points 60 and 61. The result is an optimum trailing effect N. As illustrated in FIG. 4, the trailing effect N is equal to the distance between the point at which the wheel is in contact with the ground and the point at which the turning axis (positioned in a common plane with the lines X and Y) intersects the ground. It will be clear that the trialing effect can be varied by varying the distance D or D'. Although it is preferable for the distances D (FIGS. 1 and 3) and D' (FIG. 4) to be equal, this is not imperative.

The abovementioned orientation of the lines X and A partly determines the driving characteristics of the motorcycle 50. In the embodiment illustrated, the angle between the lines X and A, on the one hand, and the horizontal plane (the ground), on the other hand, is approx. 65°. In principle, angles of between approx. 45° and 90° are possible, preferably between 60° and 70°. Although the lines X and A preferably have identical orientations (angles with respect to the horizontal plane), this is not essential and they may be at different angles from one another.

As can be seen from FIG. 4, the line C which joins the rear pivot points 62 and 63 does not run parallel to the lines A and X. In the embodiment illustrated, the lines A and C include an angle α which is approximately 35°. According to the invention, the angle α is greater than zero. The angle α preferably lies between 10° and 60°, in particular between 30° and 40°. The adjustable eccentrics 91 and 92 can be used to change the orientation of the line C, and therefore the angle α.

Incidentally, in the motorcycle according to the invention, the first and second support arms 56 and 55 are not entirely parallel, but rather include an angle of, for example, 10°, as shown in FIG. 4.

A mudguard is not shown for the sake of clarity of the drawing. However, a mudguard can easily be connected to the steering brackets in order to provide a good protective action. In a particular embodiment of the steering bracket, the mudguard is formed integrally with the steering bracket. As a result, there is no need for any additional attachment means.

What is claimed is:

1. A motorcycle having hub steering, comprising:
    a frame;
    a front wheel;
    a rear wheel; and
    an engine;
    the front wheel being provided with a hub assembly having an axle which is fixedly held in connecting pieces, the connecting pieces connected to a first set of lower support arms and a second set of upper support arms, with a hub body which is arranged around the axle and which is rotatable about a turning axis which is substantially perpendicular to the center axis of the axle,
    the first and second sets of support arms being pivotably connected to the connecting pieces via lower and upper front pivot points, which pivot points, in operation, allow a movement in a substantially vertical plane, wherein
    a front line which joins the lower and upper front pivot points, and a rear line which joins the lower and upper rear pivot points, the front line and the rear line intersecting one another at a point which lies above the support arms,
    in which the turning axis of the hub and the center axis of the axle are situated at a distance from one another, and in which there is a resilient steering connection between handle bars and the front wheel.

2. The motorcycle of claim 1 wherein the front and rear lines form an angle of from about 30° to 40°.

3. The motorcycle of claim 1 wherein the front line connecting the lower and upper front pivot points lies in the same plane as the turning axis of the hub.

4. The motorcycle of claim 1 wherein the rear line which joins the lower and upper rear pivot points is sloping forwardly with respect to the horizontal in the direction of said front wheel.

5. The motorcycle of claim 1 wherein the turning axis of the hub is sloping rearwardly with respect to the horizontal in the direction of said rear wheel.

6. The motorcycle of claim 1 wherein the distance between the turning axis of the hub and the center axis of the axle is between 3 and 5 cm.

7. The motorcycle of claim 1 wherein the center axis of the axle is arranged at a distance from the front line which joins the lower end upper front pivot points, which distance in particular is equal to the distance between the turning axis of the hub and the center axis of the axle.

8. The motorcycle of claim 1 wherein the lower and upper rear pivot points are connected to the frame by means of adjustable eccentrics.

9. The motorcycle of claim 1 further comprising steering brackets attached to the hub body for turning the hub body with respect to the turning axis of the hub.

10. The motorcycle of claim 9 wherein the steering brackets are rigidly connected to one another by at least one intermediate piece.

11. The motorcycle of claim 10 wherein the intermediate piece is connected to the frame by a centering bracket.

* * * * *